A. W. RUSSEL.
VEHICLE AXLE.
APPLICATION FILED MAY 29, 1919.
1,344,150.
Patented June 22, 1920.
2 SHEETS—SHEET 2.
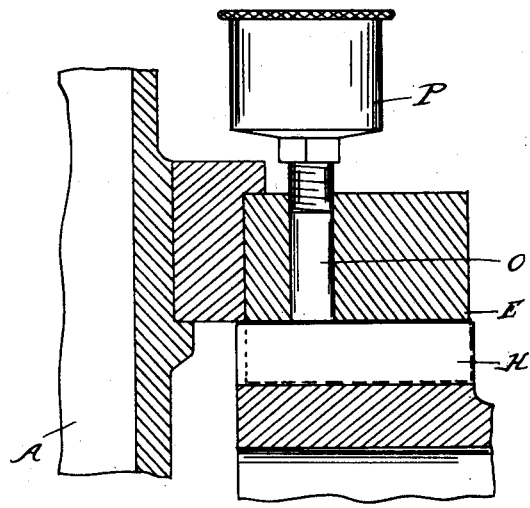
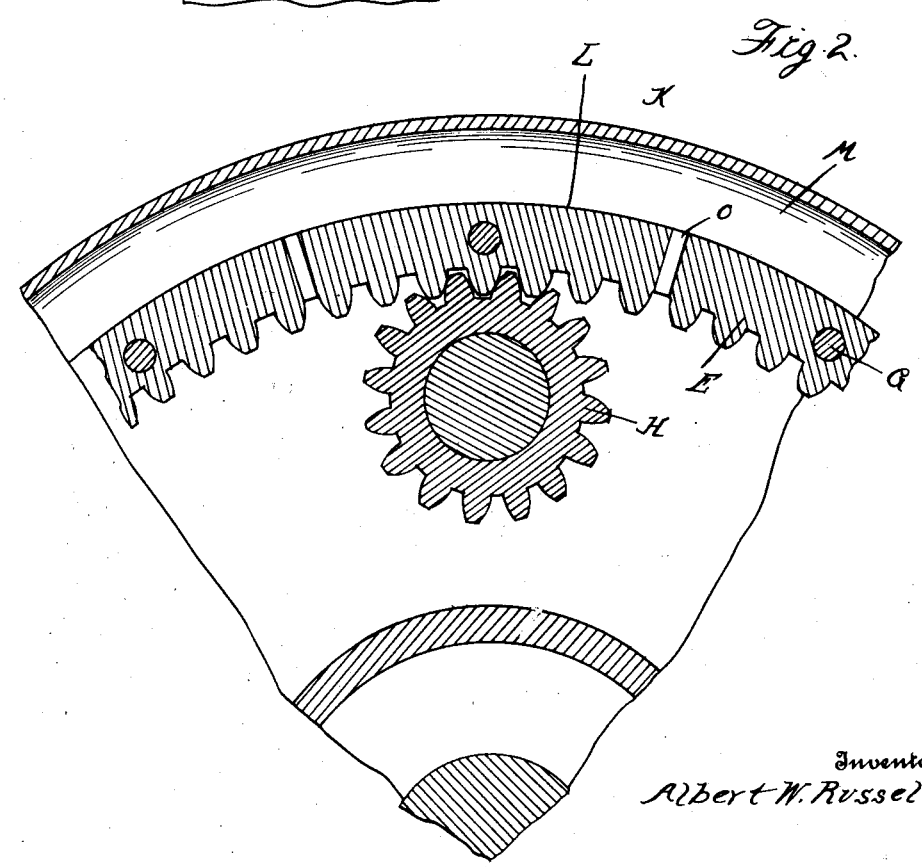
Inventor
Albert W. Russel
By Whittemore Hulbert & Whittemore
Attorneys

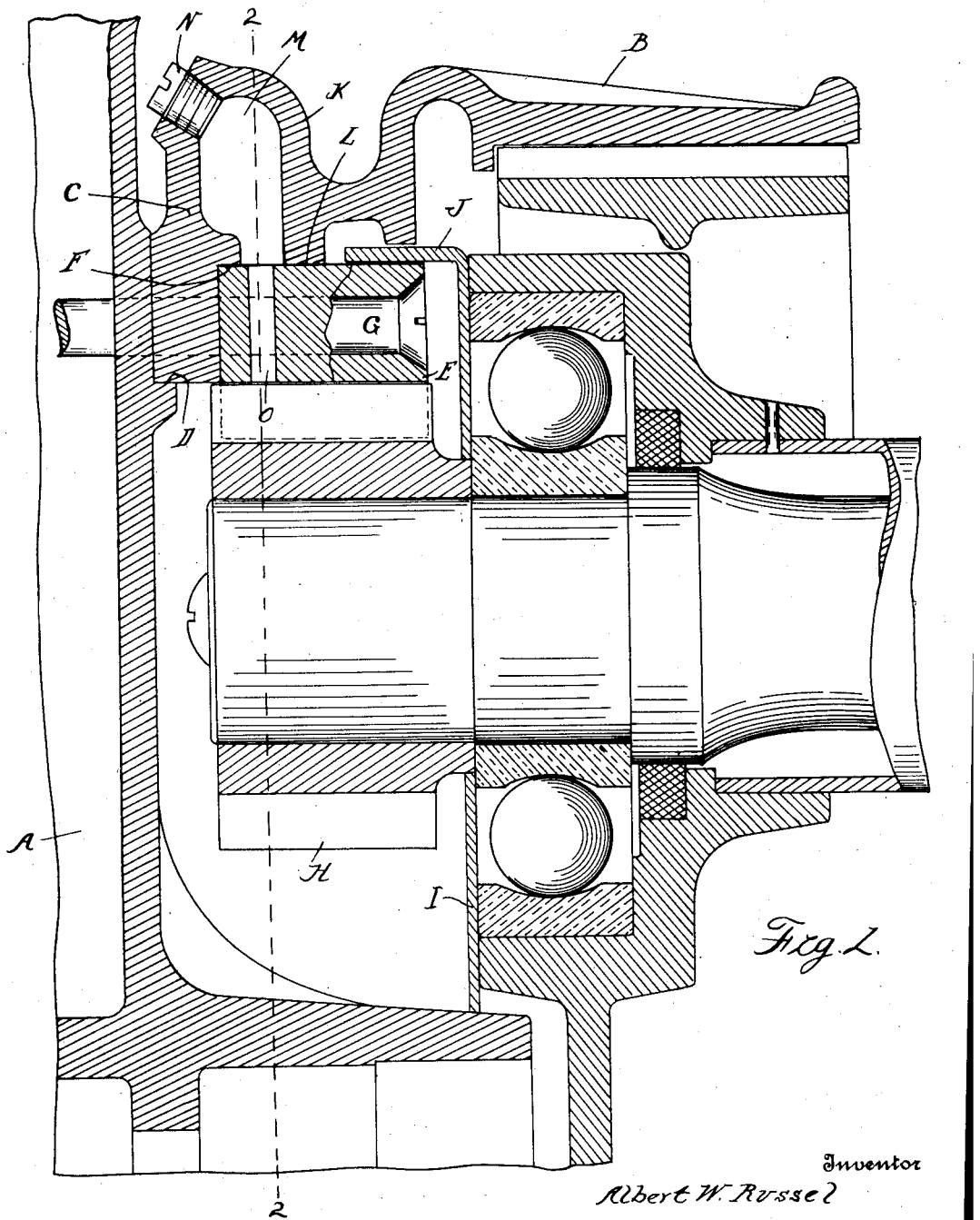

UNITED STATES PATENT OFFICE.

ALBERT W. RUSSEL, OF DETROIT, MICHIGAN, ASSIGNOR TO RUSSEL MOTOR AXLE COMPANY, OF DETROIT, MICHIGAN, A CORPORATION OF MICHIGAN.

VEHICLE-AXLE.

1,344,150.

Specification of Letters Patent. Patented June 22, 1920.

Application filed May 29, 1919. Serial No. 300,672.

*To all whom it may concern:*

Be it known that I, ALBERT W. RUSSEL, a citizen of the United States of America, residing at Detroit, in the county of Wayne and State of Michigan, have invented certain new and useful Improvements in Vehicle-Axles, of which the following is a specification, reference being had therein to the accompanying drawings.

The invention relates to vehicle axles of the type in which the wheel is driven from the jack shaft through the medium of an internal gear and pinion.

It is the object of the invention to provide means for lubricating the toothed face of the gear, and to this end the invention comprises the construction as hereinafter set forth.

In the drawings:

Figure 1 is a longitudinal section of an axle;

Fig. 2 is a cross-section on the line 2—2 Fig. 1.

Fig. 3 is a view similar to Fig. 1 showing a modified construction.

In the construction of axles of the type above referred to it is usual to place the internal gear within an outer drum or casing, which in some instances forms also a brake drum. The lubricant is placed within the gear ring and is retained by this housing in coöperation with a stationary closure plate on the axle frame. With the present invention the lubricant is held in a container outside the ring gear and is fed inward to the toothed surface through channels passing through the gear. Preferably this container for the supply of lubricant is formed in a pocket in the brake drum, as shown in Fig. 1, but it may also be held by other means, as in the modified construction shown in Fig. 3.

In detail, and as shown in Fig. 1, A is the wheel, B is the brake drum mounted thereon by means of the securing flange C which is centered by engaging the annular shoulder D. E is the internal gear ring engaging an annular shoulder F on the flange C and together with said flange secured to the wheel by the bolts G. H is a pinion in mesh with the internal gear wheel and I is a non-revoluble closure for the housing, which has a laterally projecting peripheral flange J forming a close fit with the periphery of the gear ring E. Between the braking surface of the drum B and the securing flange C is an intermediate portion K which extends outwardly and then is return-bent inwardly to bear against the periphery of the gear ring, as indicated at L. M is a chamber formed outside of the gear ring and between the walls of the return-bent portion. This chamber forms a lubricant receptacle which may be filled through an aperture normally closed by a plug N. The ring gear is provided with apertures O extending therethrough at intervals and forming communication between the chamber M and the interdental spaces of the gear. The lubricant from the chamber M will be slowly fed through these channels and will maintain the toothed surface of the gear properly lubricated.

With the construction shown in Fig. 3 there is no pocket or chamber outside of the ring gear, but the lubricant is fed through channels O' in said gear from lubricant containing cups P arranged outside thereof and the toothed surface is thus supplied with lubricant in the same manner as with the other construction.

What I claim as my invention is:—

1. In an axle, the combination with an internal gear and pinion meshing therewith, of a lubricant container arranged outside of said gear and a passage through the gear into an interdental space thereof and connected with said lubricant container.

2. In an axle, the combination with an internal gear and a pinion in mesh therewith, of means outside of said gear for holding lubricant communicating with the interdental spaces of the gear.

3. In an axle, the combination with an internal gear, of a brake drum outside said gear having an annular pocket or recess formed therein constituting a lubricant container, and channels through said gear and opening into said pocket and the interdental spaces of said gear.

4. In an axle, the combination with an internal gear, of a brake drum arranged in a plane laterally offset from said gear and having a portion extending over said gear formed with an annular pocket therein constituting a lubricant container, and channels through said gear forming communication between said pocket and the interdental spaces of said gear.

5. In an axle, the combination with the wheel, of a brake drum mounted thereon and having its braking surface laterally offset from the plane of the wheel, an internal gear mounted within said brake drum between the braking portion thereof and said wheel, said brake drum being provided with a portion intermediate the braking portion and the wheel return-bent to provide spaced bearings for said gear ring, and forming between said bearings a lubricant container which is in communication with the interdental spaces of the gear by channels therethrough.

In testimony whereof I affix my signature.

ALBERT W. RUSSEL.